US009703282B2

(12) United States Patent
Yanagidaira et al.

(10) Patent No.: US 9,703,282 B2
(45) Date of Patent: Jul. 11, 2017

(54) PORTABLE MANIPULATION COMMAND INPUT DEVICE AND APPARATUS EQUIPPED WITH MANIPULATION COMMAND INPUT DEVICE

(71) Applicants: Citizen Watch Co., Ltd., Nishitokyo-shi, Tokyo (JP); Citizen Machinery Co., Ltd., Kitasaku-Gun, Nagano (JP); Mitsubishi Electric Corporation, Chiyoda-ku, Tokyo (JP)

(72) Inventors: Shigeo Yanagidaira, Saitama (JP); Takaichi Nakaya, Tokyo (JP); Hitoshi Matsumoto, Saitama (JP); Kazuhiko Sannomiya, Saitama (JP); Shoji Oda, Tokyo (JP)

(73) Assignees: CITIZEN HOLDINGS CO., LTD., Tokyo (JP); CITIZEN MACHINERY CO., LTD., Nagano (JP); MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/430,471

(22) PCT Filed: Oct. 3, 2013

(86) PCT No.: PCT/JP2013/076893
§ 371 (c)(1),
(2) Date: Mar. 23, 2015

(87) PCT Pub. No.: WO2014/057854
PCT Pub. Date: Apr. 17, 2014

(65) Prior Publication Data
US 2015/0227134 A1    Aug. 13, 2015

(30) Foreign Application Priority Data
Oct. 10, 2012  (JP) .................................. 2012-225001

(51) Int. Cl.
*G05B 19/409*    (2006.01)
*G06F 3/041*     (2006.01)

(52) U.S. Cl.
CPC ........... *G05B 19/409* (2013.01); *G06F 3/041* (2013.01); *G05B 2219/34456* (2013.01); *G05B 2219/36004* (2013.01); *G05B 2219/36159* (2013.01)

(58) Field of Classification Search
CPC ........ G05B 19/409; G05B 2219/36004; G06F 3/041; G06F 1/1654
See application file for complete search history.

(56) References Cited

U.S. PATENT DOCUMENTS 6,525,667 B1    2/2003 Fujita et al.
2002/0095235 A1   7/2002 Hosel
(Continued)

FOREIGN PATENT DOCUMENTS

CN    101052498 A    10/2007
CN    101488018 A    7/2009
(Continued)

OTHER PUBLICATIONS

International Search Report PCT/ISA/210 for International Application No. PCT/JP2013/076893 Dated Dec. 3, 2013.
(Continued)

*Primary Examiner* — Kenneth Bukowski
(74) *Attorney, Agent, or Firm* — Harness, Dickey & Pierce, PLC

(57) ABSTRACT

A portable manipulation command input device, including a sub-console panel attachable to and removable from an automatic lathe apparatus main unit, and includes an input unit to receive input of a manipulation command to the automatic lathe apparatus main unit, a display unit to display information on the automatic lathe apparatus main unit, and
(Continued)

a radio communication unit to communicate with the automatic lathe apparatus main unit. The sub-console panel includes a detection unit and a control unit formed with the automatic lathe apparatus main unit. The detection unit includes a radio ID tag and a radio ID reader detecting the sub-console panel being placed within a predetermined range of the automatic lathe apparatus main unit. Depending on a detection result by the detection unit, the control unit allows or restricts manipulations of the automatic lathe apparatus main unit, and allows display of the information even when restricting the manipulations.

9 Claims, 6 Drawing Sheets

(56) References Cited

U.S. PATENT DOCUMENTS

| | | | |
|---|---|---|---|
| 2005/0141681 | A1 | 6/2005 | Graiger |
| 2006/0232236 | A1 | 10/2006 | Calcagno et al. |
| 2008/0125908 | A1 | 5/2008 | Sjoberg |
| 2009/0069943 | A1* | 3/2009 | Akashi .............. B25J 9/1676 700/264 |
| 2009/0079537 | A1 | 3/2009 | Seitz et al. |
| 2010/0011757 | A1 | 1/2010 | Satake et al. |
| 2012/0056732 | A1* | 3/2012 | Bergmeier .......... G08C 17/00 340/12.54 |
| 2012/0086817 | A1 | 4/2012 | Yamamoto |
| 2012/0113277 | A1 | 5/2012 | Hayakawa et al. |
| 2013/0162515 | A1* | 6/2013 | Prociw ............... G06F 1/1616 345/156 |

FOREIGN PATENT DOCUMENTS

| | | |
|---|---|---|
| CN | 101622461 A | 1/2010 |
| CN | 102668536 A | 9/2012 |
| EP | 930598 A1 | 7/1999 |
| EP | 1716982 A1 | 11/2006 |
| JP | 07225604 A | 8/1995 |
| JP | 11122723 A | 4/1999 |
| JP | 11215631 A | 8/1999 |
| JP | 2001273018 A | 10/2001 |
| JP | 2004-017223 | 1/2004 |
| JP | 03116405 U | 12/2005 |
| JP | 2006218548 A | 8/2006 |
| JP | 2007122196 A | 5/2007 |
| JP | 2007233817 A | 9/2007 |
| JP | 2008193507 A | 8/2008 |
| JP | 2009193568 A | 8/2009 |
| JP | 2009301271 A | 12/2009 |
| JP | 2010079494 A | 4/2010 |
| JP | 2011-048625 | 3/2011 |
| JP | 2011218450 A | 11/2011 |
| JP | 2011255472 A | 12/2011 |
| JP | 2012004738 A | 1/2012 |
| JP | 2012048625 A | 3/2012 |
| JP | 2012084973 A | 4/2012 |
| JP | 2012148350 A | 8/2012 |
| KR | 10-2006-0110766 | 10/2006 |
| WO | WO-9847128 A1 | 10/1998 |
| WO | WO-2007094175 A1 | 8/2007 |

OTHER PUBLICATIONS

Chinese Office Action dated Jun. 28, 2016 issued in corresponding Chinese Application No. 201380051907.4.
Korean Office Action dated Jun. 28, 2016 issued in corresponding Korean Application No. 10-2015-7009167.
Japanese Office Action dated Sep. 13, 2016 issued in corresponding Japanese Application No. 2014-540818 (with translation).
Taiwanese Office Action dated Oct. 24, 2016 issued in corresponding Taiwanese Application No. 102136525.
Chinese Office Action dated Jun. 28, 2016 issued in corresponding Chinese Application No. 20130051907.4.
Extended European Search Report dated May 30, 2016 issued in corresponding European Application No. 13845320.4.
Japanese Office Action dated Apr. 25, 2017 issued in corresponding Japanese Application No. 2014-540818 (with translation).

* cited by examiner

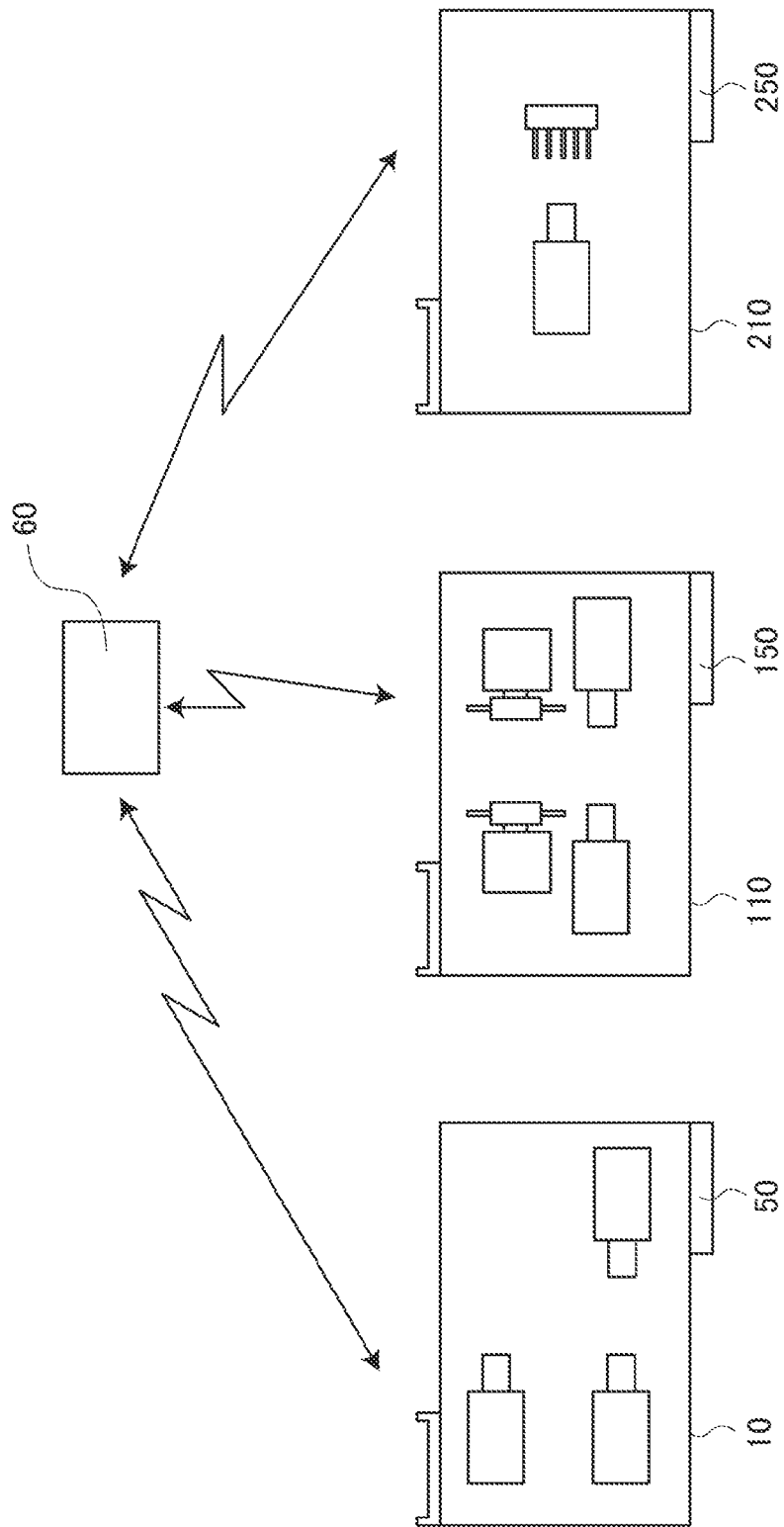

PORTABLE MANIPULATION COMMAND INPUT DEVICE AND APPARATUS EQUIPPED WITH MANIPULATION COMMAND INPUT DEVICE

TECHNICAL FIELD

The present invention relates to a portable manipulation command input device configured to operate an apparatus main unit, and able to be carried in a manner removed from the apparatus main unit, and relates to an apparatus equipped with the manipulation command input device.

BACKGROUND ART

In a numerical control machine tool (for example, an NC automatic lathe apparatus) or the like, a console panel is used to input manipulation commands associated with operations of an apparatus main unit.

As such a console panel, there have been proposed devices using a portable handy computer and a removable small manipulation panel (Patent Literatures 1, 2).

CITATION LIST

Patent Literature

Patent Literature 1: Japanese Utility Model Registration Application Publication No. Hei 03-116405
Patent Literature 2: Japanese Patent Application Publication No. 2001-273018

SUMMARY OF INVENTION

Problem to Solution

In the techniques proposed in the foregoing related art documents, a portable handy computer or a removable small manipulation panel is mounted on or connected to an apparatus main unit, and thereby is enabled to display information on the apparatus main unit and manipulate the apparatus main unit.

The small manipulation panel in Patent Literature 1 does not function unless the panel is set on the apparatus main unit.

An operator cannot easily perform check of the information on the apparatus main unit nor do the like by using the small manipulation panel at various sites away from the apparatus main unit, for example.

In the case of the handy computer in Patent Literature 2, an operator can perform check of the information on the apparatus main unit or do the like at various sites within a range of a communication cable or a range where radio communications are possible.

When the apparatus main unit performs an unexpected operation, however, an operator has difficulty in quickly responding to the unexpected operation and cannot secure the safely in some cases because the apparatus main unit can be manipulated at various sites.

The present invention has been made in view of the foregoing circumstances, and has an objective to provide a portable manipulation command input device that enables information on an apparatus main unit to be checked at various sites or the like, and is enabled to manipulate the apparatus main unit only at such a limited site or the like that, even if the apparatus main unit performs an unexpected operation, an operator can easily respond to the operation, and to provide an apparatus equipped with this manipulation command input device.

Solution to Problem

A portable manipulation command input device according to the present invention includes: an input unit configured to receive input of a manipulation command associated with an operation of an apparatus main unit; a display unit configured to display information on the apparatus main unit; and a communication unit configured to communicate with the apparatus main unit to receive the information and send a manipulation command signal conveying the manipulation command to the apparatus main unit. The portable manipulation command input device is provided to be attachable to and removable from the apparatus main unit, and is configured to display the information and manipulate the apparatus main unit. The portable manipulation command input device includes a detection unit and a restriction unit formed in collaboration with the apparatus main unit. The detection unit is configured to detect the portable manipulation command input device being placed within a predetermined range of the apparatus main unit. The restriction unit is configured to allow display of the information and a manipulation of the apparatus main unit when the detection unit detects the portable manipulation command input device being placed within the predetermined range, and to restrict a manipulation of the apparatus main unit whereas allowing display of the information when the portable manipulation command input device is placed out of the range.

In addition, an apparatus according to the present invention includes an apparatus main unit and the portable manipulation command input device according to the present invention.

Advantageous Effects of Invention

According to the portable manipulation command input device and the apparatus equipped with the manipulation command input device of the present invention, the portable manipulation command input device enables information on the apparatus main unit to be checked at various sites or the like on only one condition that the portable manipulation command input device and the apparatus main unit can communicate with each other, and is enabled to manipulate the apparatus main unit only at a limited site or the like.

With this configuration, even if the apparatus main unit performs an unexpected operation, an operator can respond to the operation easily and quickly, which leads to improvement in the safety in manipulations of the apparatus main unit.

BRIEF DESCRIPTION OF DRAWINGS

FIG. 7 is a schematic view illustrating a situation where three automatic lathe apparatus main units are placed in a wireless LAN environment.

DESCRIPTION OF EMBODIMENTS

Hereinafter, with reference to the drawings, description is provided for embodiments of a portable manipulation command input device and an apparatus equipped with a manipulation command input device according to the present invention.

Figure 1:
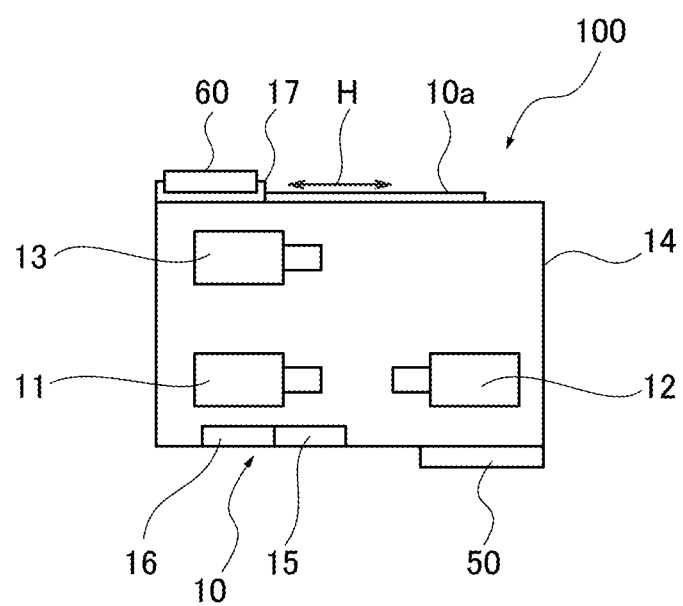
FIG. 1 is a schematic view illustrating an apparatus equipped with a portable manipulation command input device which is an embodiment of the present invention.

An automatic lathe apparatus 100 illustrated in FIGS. 1 and 2 is an embodiment of an apparatus according to the present invention.

An automatic lathe apparatus main unit 10 for machining materials is provided with a main console panel 50 and a sub-console panel 60.

The automatic lathe apparatus main unit 10 is an example of an apparatus main unit.

The main console panel 50 is an example of a manipulation command input device.

The sub-console panel 60 is an example of a portable manipulation command input device.

As illustrated in FIG. 1, the automatic lathe apparatus main unit 10 includes three main spindles 11, 12, 13 and a tool post and other things for machining inside an exterior cover 14.

The automatic lathe apparatus main unit 10 is provided with a control unit 16 configured to control actions of the foregoing main spindles 11 and others.

Figure 2A:
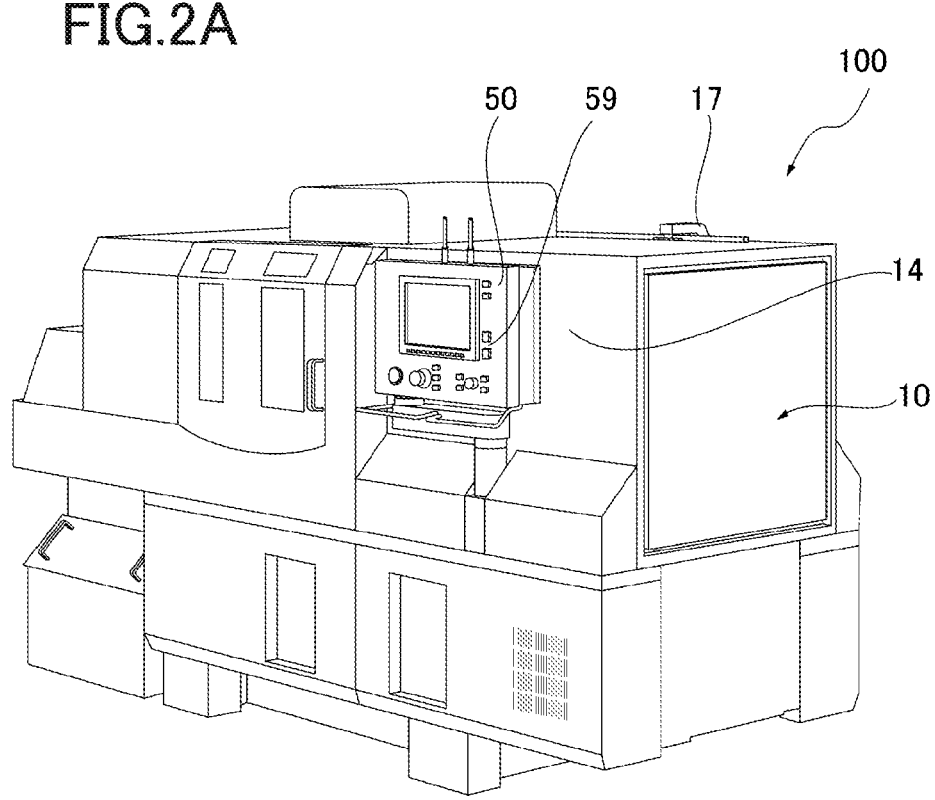
FIG. 2A is a view illustrating an external appearance (on a main console panel side) of the automatic lathe apparatus illustrated in FIG. 1.

The main console panel 50 is fixed to a front side of the exterior cover 14 as illustrated in FIG. 2A.

The main console panel 50 is connected to the control unit 16.

A worker or the like can input a manipulation command associated with each operation of the automatic lathe apparatus main unit 10 to the main console panel 50.

The main spindles 11, 12, 13, the tool post and the other things perform operations independent of each other under the control of the control unit 16 based on the inputted manipulation commands.

The input of the manipulation commands to the automatic lathe apparatus main unit 10 is usually performed on the main console panel 50.

Figure 2B:
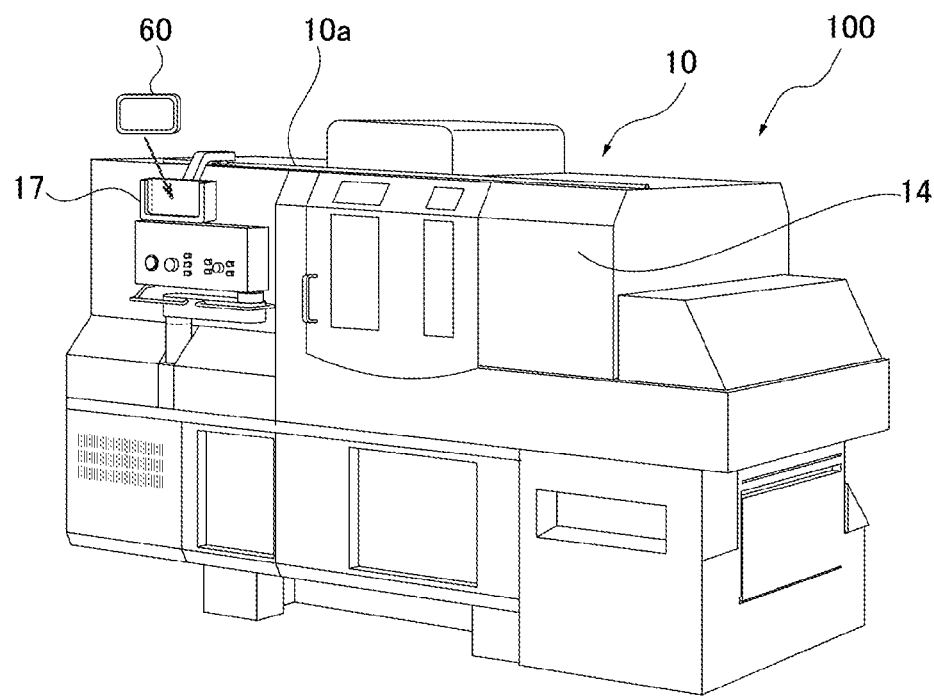
FIG. 2B is a view illustrating an external appearance (on a sub-console panel side) of the automatic lathe apparatus illustrated in FIG. 1.

A holder 17 is provided on a back side of the exterior cover 14, as illustrated in FIG. 2B.

The holder 17 is attached to be movable along a linear guide 10a extending in horizontal directions H.

The sub-console panel 60 is inserted into the holder 17 in a detachably attached manner.

The sub-console panel 60 is attached to the automatic lathe apparatus main unit 10 by being inserted in the holder 17.

The sub-console panel 60 is able to be carried independently of the automatic lathe apparatus main unit 10 when being removed from the holder 17.

The sub-console panel 60 is attachable to and removable from the automatic lathe apparatus main unit 10.

The sub-console panel 60 is constituted by, for example, a tablet type personal computer.

Figure 3:
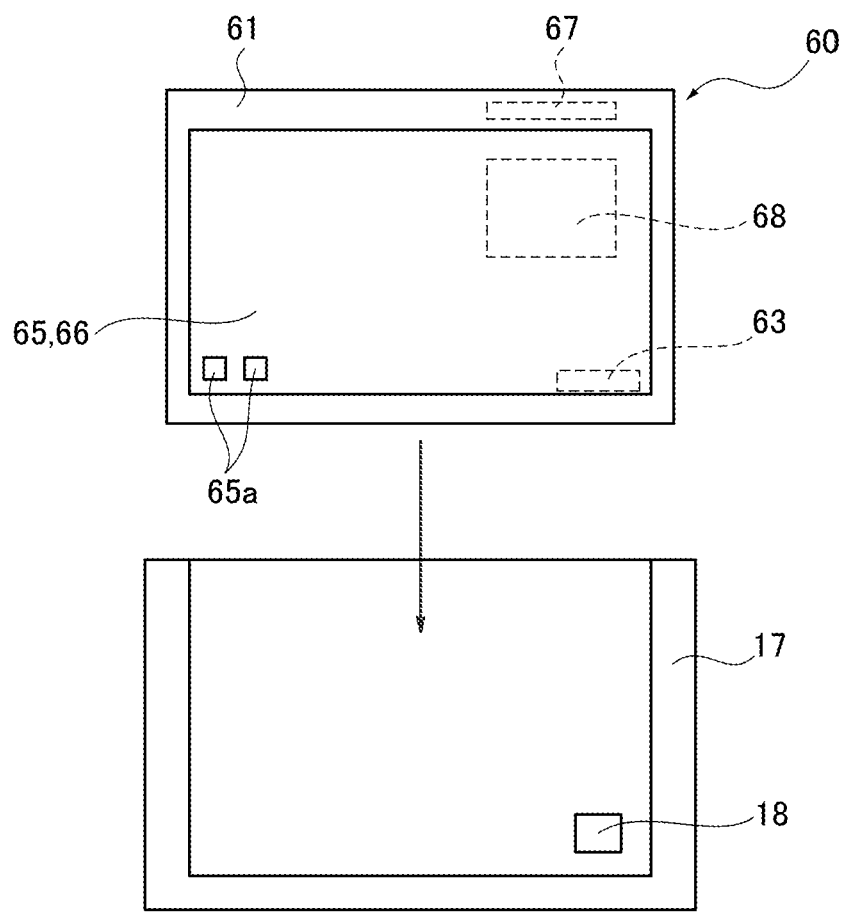
FIG. 3 is a view illustrating how to attach a sub-console panel to a holder.

As illustrated in FIG. 3, a display unit 65 is provided on a front side 61 of the sub-console panel 60.

The display unit 65 displays information on the status and the like of the automatic lathe apparatus main unit 10, and other information.

The display unit 65 includes a display surface configured as what is termed a touch panel type input unit to also function as an input unit 66.

The display unit 65 displays buttons, icons and a software keyboard (hereinafter, referred to as the buttons and others), which indicate the manipulation commands associated with the operations of the automatic lathe apparatus main unit 10.

If a finger or a pen touches any of the buttons and others, the manipulation command indicated by the touched one of the buttons and others is inputted.

A worker or the like can input the manipulation commands associated with the operations of the automatic lathe apparatus main unit 10 by manipulating the display surface of the display unit 65.

Figure 4:
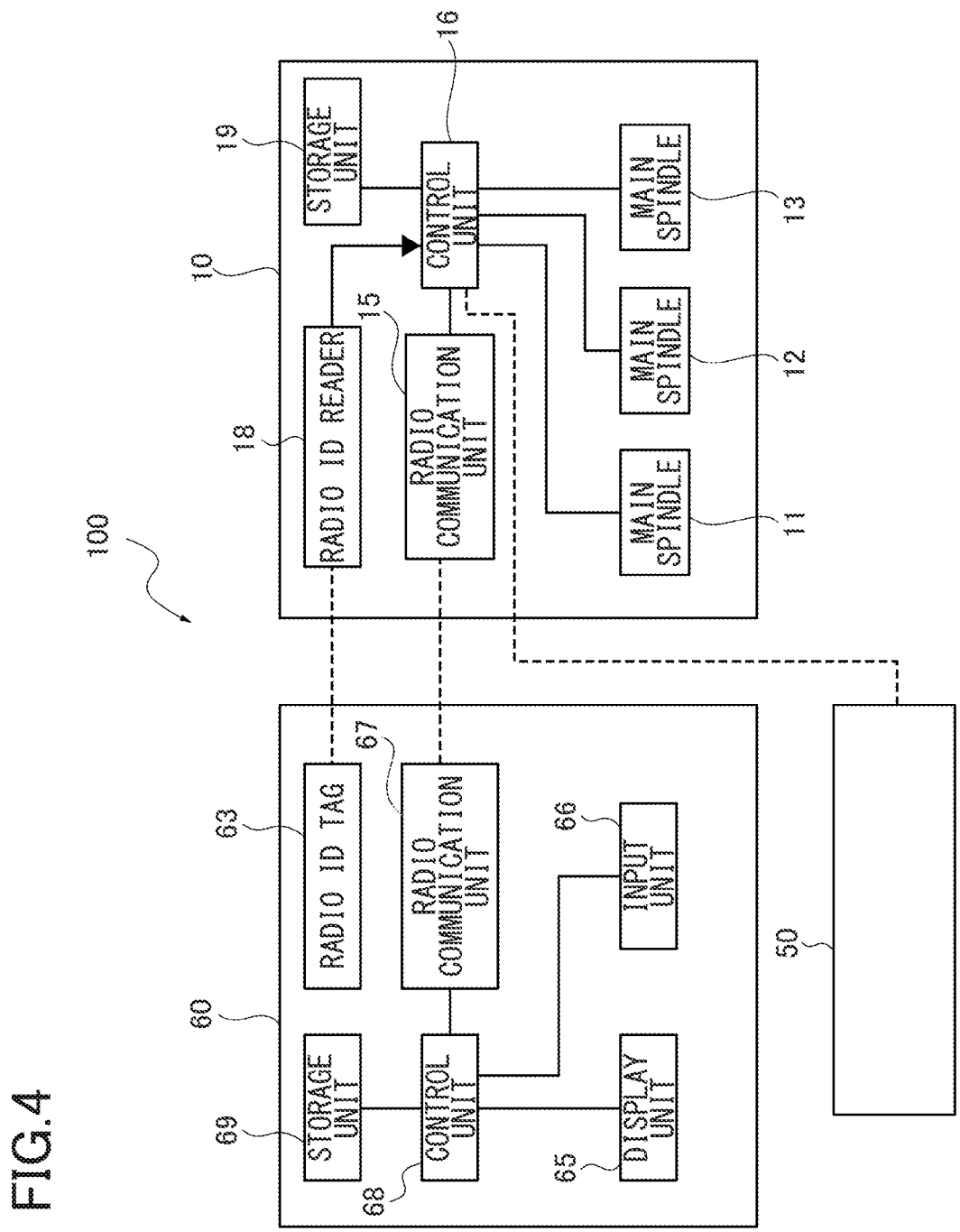
FIG. 4 is a block diagram for explaining processing to be collaboratively performed by an automatic lathe apparatus main unit and the sub-console panel.

As illustrated in FIG. 4, the sub-console panel 60 includes a control unit 68, a storage unit 69 and a radio communication unit 67.

The control unit 68 controls the actions of the sub-console panel 60.

The storage unit 69 stores predetermined information in advance.

The input unit 66, the display unit 65 and the radio communication unit 67 are connected to the control unit 68.

The automatic lathe apparatus main unit 10 includes a radio communication unit 15.

The radio communication unit 67 and the radio communication unit 15 communicate with each other via a wireless LAN.

The sub-console panel 60 and the automatic lathe apparatus main unit 10 communicate with each other via the radio communication unit 67 and the radio communication unit 15.

The radio communication unit 15 is connected to the control unit 16.

The control unit 16 performs processing according to radio signals received by the radio communication unit 15.

When the worker or the like inputs a manipulation command to the input unit 66, the input unit 66 outputs a manipulation command signal corresponding to the inputted manipulation command to the control unit 68.

Under the condition that connection between the radio communication unit 67 and the radio communication unit 15 is established by the wireless LAN, the radio communication unit 67 communicates with the radio communication unit 15 to transmit the manipulation command signal from the control unit 68 to the control unit 16 and to receive information on the automatic lathe apparatus main unit 10 and other information transmitted from the control unit 16 to the control unit 68.

Thus, by using the sub-console panel 60 as similar to the main console panel 50, the worker or the like can operate each of the main spindles 11, 12, 13 via the control unit 16, and check the information on the automatic lathe apparatus main unit 10 by causing the sub-console panel 60 to display the information.

The sub-console panel 60 can be used in place of the main console panel 50 in a case where the worker or the like cannot sufficiently check the operation of the automatic lathe apparatus main unit 10 while inputting a manipulation command to the main console panel 50, such as a case where the worker or the like checks and manipulates the automatic lathe apparatus main unit 10 from the back side.

Figure 5:
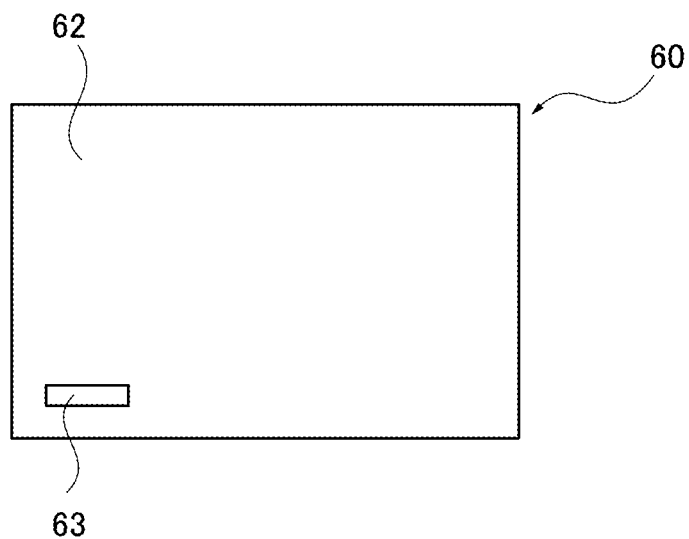
FIG. 5 is a view illustrating a radio ID tag attached to a back side of the sub-console panel.

As illustrated in FIG. 5, a radio ID tag 63 is bonded to a back side 62 of the sub-console panel 60.

The radio ID tag 63 stores a unique identification number (ID number) set for each sub-console panel 60.

The ID number of the radio ID tag is also stored in the storage unit 69 and is registered in the sub-console panel 60.

As illustrated in FIG. 3, the holder 17 is provided with a radio ID reader 18.

Figure 6:
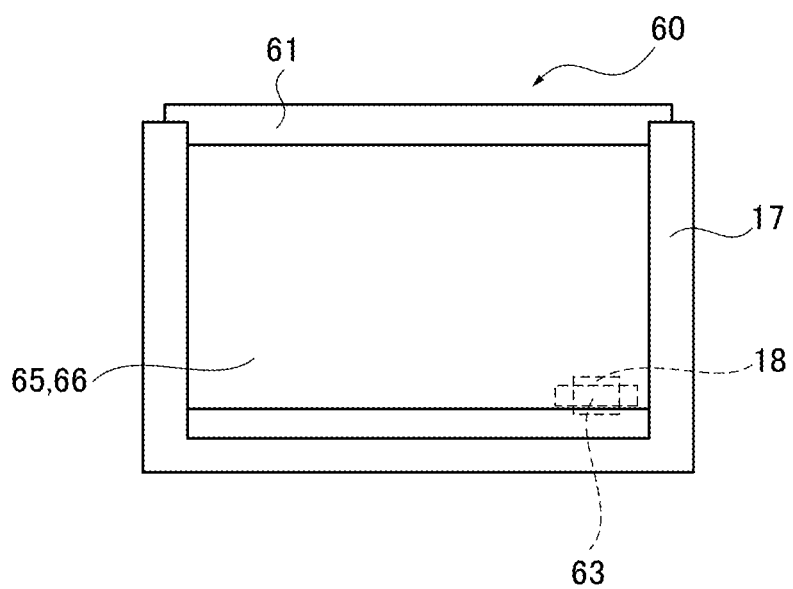
FIG. 6 is a view illustrating a positional relationship between the radio ID tag and a radio ID reader in a state where the sub-console panel is attached to the holder.

As illustrated in FIG. 6, the radio ID reader 18 comes close to and faces the radio ID tag 63 when the sub-console panel 60 is inserted into the holder 17.

When the sub-console panel 60 is inserted in the holder 17, the radio ID reader 18 reads the ID number from the radio ID tag 63 of the sub-console panel 60.

The ID number read by the radio ID reader 18 is inputted to the control unit 16.

The control unit 16 transmits the information on the inputted ID number to the control unit 68 via the radio communication units 15, 67.

The control unit 68 checks matching between the received ID number and the ID number stored in advance in the storage unit 69.

The control unit 68 functions as one example of a matching unit for checking matching between the two ID numbers.

The control unit 68 determines that the sub-console panel 60 is inserted in the holder 17 when the two ID numbers match each other.

If the two ID numbers match each other, the control unit 68 causes the display unit 65 to display a screen for manipulating the automatic lathe apparatus main unit 10, and enables the input unit 66 to receive input to the buttons and others in the screen displayed on the display unit 65.

An example of a detection unit for detecting the sub-console panel 60 being placed within a predetermined range of the automatic lathe apparatus main unit 10 is composed of the radio ID tag 63, the radio communication unit 67, the control unit 68 and the storage unit 69 on the sub-console panel 60 side, and the radio communication unit 15, the radio ID reader 18, and the control unit 16 on the automatic lathe apparatus main unit 10 side.

As described above, the detection unit is formed between the automatic lathe apparatus main unit 10 and the sub-console panel 60.

In the present embodiment, to insert the sub-console panel 60 into the holder 17 means to place the sub-console panel 60 within the predetermined range.

If the foregoing detection unit detects the sub-console panel 60 being placed within the predetermined range (inserted into the holder 17), the sub-console panel 60 is allowed to manipulate the automatic lathe apparatus main unit 10.

The detection unit in the present embodiment is configured to recognize that the input device is placed within the predetermined range of the apparatus main unit when the portable manipulation command input device is placed at a certain preset setting position of the apparatus main unit, and to detect the sub-console panel 60 being set at this setting position (the sub-console panel 60 being inserted into the holder 17).

On the other hand, if the two ID numbers do not match, the manipulation of the automatic lathe apparatus main unit 10 through the sub-console panel 60 is restricted.

For example, the control unit 68 restricts manipulations of the automatic lathe apparatus main unit 10 as follows. Specifically, the control unit 68 causes the display unit 65 to display the screen for manipulating the automatic lathe apparatus main unit 10 in which the buttons and others of the manipulation commands associated with the operations of the automatic lathe apparatus main unit 10 are displayed in an inactive state (input-disabled state) so as to prohibit any manipulation command from being inputted to the input unit 66. Alternatively, the control unit 68 restricts an output of a manipulation command signal and stops the manipulation command signal from being transmitted to the automatic lathe apparatus main unit 10.

However, the sub-console panel 60 is configured such that, under the condition that the connection between the radio communication unit 67 and the radio communication unit 15 is established by the wireless LAN, the information other than the manipulation commands associated with the operations of the automatic lathe apparatus main unit 10 can be displayed on the display unit 65 based on information on the automatic lathe apparatus main unit 10 received from the radio communication unit 15, irrespective of whether or not the sub-console panel 60 is inserted in the holder 17.

Instead, the sub-console panel 60 can be also configured to display information with the display related to the manipulation commands presented in the inactive state.

Thus, based on data transmitted from the control unit 16, the control unit 68 is able to cause the display unit 65 to display, for example, information on the automatic lathe apparatus main unit 10, i.e., the information on the automatic lathe apparatus main unit 10 such as an operation status, a setup status and specifications.

As described above, under the condition that the connection between the radio communication unit 67 and the radio communication unit 15 is established by the wireless LAN, the information on the automatic lathe apparatus main unit 10 is displayed on the sub-console panel 60, and the worker or the like can easily know the operating conditions and the like of the automatic lathe apparatus main unit 10.

However, if the sub-console panel 60 is not placed within the predetermined range of the automatic lathe apparatus main unit 10 and any manipulation of the automatic lathe apparatus main unit 10 through the sub-console panel 60 is not allowed, the worker or the like cannot manipulate the automatic lathe apparatus main unit 10 through the sub-console panel 60.

In this way, the automatic lathe apparatus main unit 10 is prevented from being manipulated through a certain sub-console panel.

The certain sub-console panel is, for example, a panel to which the radio ID tag 63 is not bonded, a panel whose ID number is not stored in the storage unit 69, a panel with the radio ID tag 63 whose ID number does not match the ID number stored in the storage unit 69.

Since the sub-console panel 60 is attachable to and removable from to the automatic lathe apparatus main unit 10, the worker or the like can easily check the operating conditions and the like of the automatic lathe apparatus main unit 10 or do the like by using the sub-console panel 60 at a site away from the automatic lathe apparatus main unit 10.

When the manipulations of the automatic lathe apparatus main unit 10 through the sub-console panel 60 are allowed, the sub-console panel 60 is set in the holder 17 on the back side of the automatic lathe apparatus main unit 10.

In this state, even if the automatic lathe apparatus main unit 10 performs an unexpected operation, it is easy for an operator to quickly respond to the operation and to manipulate the automatic lathe apparatus main unit 10 safely.

Here, if the sub-console panel 60 or the automatic lathe apparatus main unit 10 is powered off (the power supply is cut off), if the communications between the sub-console panel 60 and the automatic lathe apparatus main unit 10 are disconnected, if the automatic lathe apparatus main unit 10 falls into an emergency stop state, if the sub-console panel 60 is removed from the holder 17, or if the display related to the manipulation commands is turned off, the state where the sub-console panel 60 is allowed to manipulate the automatic lathe apparatus main unit 10 can be switched to the manipulation-restricted state for the moment.

In the automatic lathe apparatus 100 in the present embodiment, the control unit 68 receives information from the control unit 16, determines whether or not to allow manipulations, and controls the actions of the display unit 65 and the input unit 66 to consequently restrict the manipulations of the automatic lathe apparatus main unit 10 through the sub-console panel 60 and to allow or reject the information display on the sub-console panel 60.

Thus, between the automatic lathe apparatus main unit 10 and the sub-console panel 60, the control unit 16 and the control unit 68 collaboratively form a restriction unit for: allowing the information display and the manipulations of the automatic lathe apparatus main unit 10 if the detection unit detects the sub-console panel 60 being placed within the predetermined range; and restricting the manipulations of the automatic lathe apparatus main unit 10 while allowing the information display when the sub-console panel 60 is placed out of the aforementioned range.

In addition, the main console panel 50 and the sub-console panel 60 are provided with selection units 59, 65a, respectively, each including a switch or the like for selecting which one of the main console panel 50 and the sub-console panel 60 is used to manipulate the automatic lathe apparatus main unit 10.

The control unit 16 allows the manipulation commands from the main console panel 50 and the sub-console panel 60 such that the automatic lathe apparatus main unit 10 can be manipulated only through the console panel selected in both the selection unit 59 of the main console panel 50 and the selection unit 65a of the sub-console panel 60.

For example, when the main console panel 50 is selected in the selection unit 59 and the main console panel 50 is selected also in the selection unit 65a, the automatic lathe apparatus main unit 10 can be manipulated only on the main console panel 50.

Conversely, when the sub-console panel 60 is selected in the selection unit 59 and the sub-console panel 60 is selected also in the selection unit 65a, the automatic lathe apparatus main unit 10 can be manipulated only on the sub-console panel 60.

When the main console panel 50 is selected in the selection unit 59 and the sub-console panel 60 is selected in the selection unit 65a, or when the sub-console panel 60 is selected in the selection unit 59 and the main console panel 50 is selected in the selection unit 65a, the control unit 16 invalidates or disables an input of a manipulation command from both the console panels 50, 60 and waits until the console panel (50 or 60) selected in the selection unit 59 and the console panel (50 or 60) selected in the selection unit 65a match each other.

If the selected console panels match each other as a result of waiting the matching between the selections, the control unit 16 operates in accordance with the foregoing operations.

In the present embodiment, the selection unit 65a is configured of an icon switch of touch panel type displayed on the display surface.

The selection unit 65a, however, may be a switch constituted by hardware or the like placed near the sub-console panel 60 (holder 17).

In addition, the selection unit 59 may be a switch of touch panel type displayed on the display surface of the main console panel 50.

The selection unit 59, the selection unit 65a, and the control unit 16 are configured as one example of an input switch unit in the present invention.

As illustrated in FIG. 7, for example, if there are multiple automatic lathe apparatus main units 10, 110, 210 (three in an example in FIG. 7) having configurations same as or different from the automatic lathe apparatus main unit 10 and including their respective corresponding main console panels 50, 150, 250, the sub-console panel 60 can be configured to establish connection via a wireless LAN to any selected one of the three automatic lathe apparatus main units 10, 110, 210.

With this configuration, the worker or the like can cause the sub-console panel 60 to display information on the automatic lathe apparatus main unit to which the connection is established, can manipulate the automatic lathe apparatus main unit by placing the sub-console panel 60 within the predetermined range (inserting the sub-console panel 60 in the holder 17), or can do the like.

For example, the sub-console panel 60 can be configured as follows. Specifically, when the sub-console panel 60 is connected to a wireless LAN where the three automatic lathe apparatus main units 10, 110, 210 exist, the three automatic lathe apparatus main units 10, 110, 210 are displayed in a selectable manner on the display unit 65. Then, when the operator selects any one of the automatic lathe apparatus main units 10, 110, 210, the connection between the sub-console panel 60 and the selected automatic lathe apparatus main unit is established.

Even if the multiple automatic lathe apparatus main units 10, 110, 210 are under the environment with the wireless LAN, the connection between the sub-console panel 60 and any one of the automatic lathe apparatus main units 10, 110, 210 can be established easily.

Since there is no need to individually provide the sub-console panels 60 to the three automatic lathe apparatus main units 10, 110, 210, the cost for manufacturing the automatic lathe apparatus main units 10, 110, 210 can be reduced.

If the sub-console panel 60 is used at a relatively low frequency at which the sub-console panel 60 is used only for maintenance of the automatic lathe apparatus main unit 10 and others, providing the sub-console panel 60 to each automatic lathe apparatus main unit 10 is costly.

Use of the single sub-console panel 60 for the multiple automatic lathe apparatus main units 10, 110, 210 as in the present embodiment makes it possible not only to reduce the cost but also to improve the convenience.

In another possible configuration, the sub-console panel 60 may establish connection to all the automatic lathe apparatus main units 10, 110, 210 to display the information on the multiple automatic lathe apparatus main units 10, 110, 210 by establishing the, or to selectively switch any one of the automatic lathe apparatus main units 10, 110, 210 to another, and perform information display and a manipulation of the switched-to automatic lathe apparatus main unit 10, 110, 210.

The sub-console panel 60 in the present embodiment is described above on the assumption that the sub-console panel 60 is under the same wireless LAN environment as the wireless LAN to which the automatic lathe apparatus main units 10, 110, 210 belong.

However, if the wireless LAN to which the automatic lathe apparatus main units 10, 110, 210 belong is connected to a different LAN through a network, the sub-console panel 60 can be connected to a certain one of the automatic lathe apparatus main units 10, 110, 210 via the different LAN and the wireless LAN to which the automatic lathe apparatus main units 10, 110, 210 belong.

Through such connection, the display unit 65 of the sub-console panel 60 can display the information on the certain automatic lathe apparatus main unit 10, 110, 210 or do the like.

The automatic lathe apparatus main units 10, 110, 210 may be connected to the same LAN or may be connected to different LANs as long as each of the automatic lathe apparatus main units 10, 110, 210 can communicate with the sub-console panel 60.

Each of the automatic lathe apparatus main units 10, 110, 210 may be connected to the certain membered LAN through a wireless LAN, or through wired connection via a network cable or the like.

The sub-console panel 60 and the automatic lathe apparatus main units 10, 110, 210 may communicate with each other directly as in an ad hoc mode or the like, or may communicate with each other through a wireless LAN host such as an access point as in an infrastructure mode or the like.

The sub-console panel 60 can be also connected through wired connection line to the LAN to which each of the automatic lathe apparatus main units 10, 110, 210 belongs.

The sub-console panel 60 to which the wired connection is applied may include an interface for wired connection to a LAN, for example, a LAN board for wired connection or the like.

In the present invention, the sub-console panel 60 of the present embodiment is applicable as a main console panel.

As the sub-console panel 60 of the present embodiment, a tablet type personal computer is applied, but instead of it, a devise such for example as a mobile information terminal device or general-purpose personal computer (in particular, a lap-top type computer) may be applied.

The sub-console panel 60 of the present embodiment is one in which the control unit 68 controls the display unit 65, the input unit 66, the radio communication unit 67, and the like in accordance with processing procedures of application software stored in advance in the storage unit 69. Thus, if the stored application software is replaced or edited, the sub-console panel 60 can be applied as a console panel for inputting manipulation commands, not only to the particular automatic lathe apparatus main unit 10 or others, but also to various apparatus main units.

The sub-console panel 60 of the present embodiment is identified by the radio ID reader 18 reading the ID number stored in the radio ID tag 63.

The configuration for identifying the sub-console panel 60 is not limited to the radio ID tag 63, but may be anything if it can identify the sub-console panel 60 individually.

For example, in one applicable configuration, the ID number is stored as a barcode or a two dimensional matrix code, this barcode or two dimensional matrix code instead of the radio ID tag 63 is attached to the sub-console panel 60, and the automatic lathe apparatus main unit 10 is provided with a scanner to optically read the barcode or two dimensional matrix code, instead of the radio ID reader 18.

Moreover, the sub-console panel 60 of the present embodiment is allowed to manipulate the automatic lathe apparatus main unit 10 only when the sub-console panel 60 is set in the holder 17 and is authorized with the ID number. Instead, the sub-console panel 60 may be allowed by the automatic lathe apparatus main unit 10 when being just set in the holder 17, for example.

In this case, the sub-console panel 60 does not have to include the radio ID tag 63, or the automatic lathe apparatus main unit 10 does not have to include the radio ID reader 18, either.

The automatic lathe apparatus main unit 10, however, needs to include a sensor, such as a limit switch, for detecting the sub-console panel 60 being inserted in the holder 17. When such a sensor detects the sub-console panel 60 being inserted in the holder 17, the sensor may notify the control unit 16 and the control unit 16 may allow the sub-console panel 60 to input manipulation commands to the automatic lathe apparatus main unit 10.

In another applicable configuration, a predetermined password is displayed on an automatic lathe apparatus main unit 10 side such as the main console panel 50, and the sub-console panel 60 is determined to be properly inserted in the holder 17, when this password is inputted to the sub-console panel 60 and a sensor or the like detects the sub-console panel 60 being inserted into the holder 17 before a predetermined period of time passes after the password input.

The sub-console panel 60 of the present embodiment imposes no limitation on the information on the automatic lathe apparatus main unit 10 and other things displayed on the display unit 65.

However, a level of information on the automatic lathe apparatus main unit 10 and other things displayed on the display unit 65 may be set such that the level can vary depending on the job authority or the like held by an operator using the sub-console panel 60.

In order to identify an operator using the sub-console panel 60, the sub-console panel 60 may be configured to cause the display unit 65 to display a prompt to ask for input of an operator's ID number, for example, when the sub-console panel 60 establishes LAN connection with the automatic lathe apparatus main unit 10. Here, the operator's ID number is set for each operator in advance.

In this case, the operator inputs his/her own operator's ID number to the input unit 66.

When the operator's ID number is inputted, the control unit 68 makes an inquiry to the control unit 16 through the radio communication units 67, 15, and the control unit 16 sends data to the control unit 68 through the radio communication units 15, 67 in response to the inquiry, the data including all the combinations of operator's ID numbers and the limits of authorities associated with the operator's ID numbers, which are stored in advance in a storage unit 19 of the automatic lathe apparatus main unit 10.

The limit of authority is set depending on the job authority or the like of the operator identified with each operator's ID number.

The control unit 68 checks whether or not the sent data includes the operator's ID number inputted to the input unit 66.

When the matched operator's ID number exists as a result of the operator's ID number checking, the control unit 68 sets, based on the limit of authority associated with the matched operator's ID number, a range (level) of information on the automatic lathe apparatus main unit 10 and other things to which the operator is permitted to refer through the sub-console panel 60.

For example, in displaying the information on the automatic lathe apparatus main unit 10 and other things on the basis of data from the control unit 16, the control unit 68 causes the display unit 65 to display information according to the set level of information.

In this way, when an operator having a low job authority uses the sub-console panel 60, only the information permitted for the authority is displayed on the display unit 65.

When an operator having a high job authority uses the sub-console panel 60, the information and additional information permitted for the authority are displayed on the display unit 65.

The authority for each operator may be associated with not only a level of the information on the automatic lathe apparatus main unit 10 and other things displayed on the display unit 65, but also even a level of manipulation commands to the automatic lathe apparatus main unit 10 and others.

In another configuration, when the operator's ID number is inputted to the input unit 66, the control unit 68 may transmit the operator's ID number to the control unit 16 via the radio communication units 67, 15, and the control unit 16 may check the received operator's ID number against the data stored in advance in the storage unit 19.

In this case, when the matched operator's ID number exists as a result of the operator's ID number checking, the control unit 16 sends information on the limit of authority of the matched operator's ID number to the control unit 68 through the radio communication units 15, 67, and the control unit 68 sets, based on the received data, a range of the information on the automatic lathe apparatus main unit 10 and other things to which the operator is permitted to refer through the sub-console panel 60.

In the present invention, a restriction unit may be configured such that manipulation restriction of the automatic lathe apparatus main unit 10, rejection of the information display thereof, control of the display level, and the like can be performed by the control unit 16 alone, or by the control unit 16 and the control unit 68 in a collaborative manner, and this configuration may be used as one example of the restriction unit formed between the automatic lathe apparatus main unit 10 and the sub-console panel 60.

For example, a matching unit may be configured by using the control unit 16. In this configuration, the control unit 68 sends the ID number stored in the storage unit 69 to the radio communication unit 15 through the radio communication unit 67. The control unit 16 performs matching between the ID number of the radio ID tag 63 read by the radio ID reader 18 and the ID number received by the radio communication unit 15.

In this case, the control unit 16 determines that the sub-console panel 60 is inserted in the holder 17 when the two ID numbers match each other.

If the two ID numbers match each other, the control unit 16 sends the control unit 68 information allowing manipulations of the automatic lathe apparatus main unit 10 through the sub-console panel 60. Then, the control unit 68 causes the display unit 65 to display the screen for manipulating the automatic lathe apparatus main unit 10, and enables the input unit 66 to receive input to the buttons and others in the screen displayed on the display unit 65.

Moreover, in another possible configuration, the control unit 16 sends the control unit 68 data enabling manipulations of the automatic lathe apparatus main unit 10 through the sub-console panel 60, and the control unit 68 causes the display unit 65, for example, to display the screen for manipulating the automatic lathe apparatus main unit 10 based on the data sent from the control unit 16.

Here, if the two ID numbers do not match each other, the manipulations of the automatic lathe apparatus main unit 10 through the sub-console panel 60 can be restricted in such a way that: the control unit 16 is stopped from sending the control unit 68 the information allowing manipulations of the automatic lathe apparatus main unit 10 through the sub-console panel 60; or the control unit 16 sends the control unit 68 data disabling the display unit 65 from displaying the screen for manipulating the automatic lathe apparatus main unit 10 or data causing the display unit 65 to present inactive (input-disabled) display of the buttons and others of the manipulation commands associated with the operations of the automatic lathe apparatus main unit 10.

The automatic lathe apparatus 100 in the present embodiment is one example of a machine tool. An apparatus according to the present invention is not limited to the automatic lathe apparatus, but may be any machine tool (in particular, a numerical control type) other than the lathe apparatus.

Even besides the machine tool, any apparatus having a certain manipulation unit, such for example as a monitoring apparatus for monitoring the conditions of a subject or a vehicle, may be applied as an apparatus according to the present invention.

In this case, a manipulation unit in the apparatus is used as the portable manipulation command input device, and part of the apparatus including an operation part while excluding the manipulation unit is used as the apparatus main unit. Thus, the manipulation unit may be applied as the portable manipulation command input device according to the present invention.

The automatic lathe apparatus 100 of the present embodiment employs the holder 17 in the form in which the sub-console panel 60 is inserted by being slid downward from the upper side.

In the apparatus according to the present invention, however, the configuration of attaching the portable manipulation command input device (equivalent to the sub-console panel 60 of the present embodiment) to the apparatus main unit is not limited to the foregoing configuration of the holder 17.

The configuration of attaching the portable manipulation command input device to the apparatus main unit may be a configuration in which the input device is just placed from the upper side or is hung, and may be any configuration of an attachment unit to and from which the portable manipulation command input device is attachable and removable.

CROSS-REFERENCE TO RELATED APPLICATION

This application claims the benefit of Japanese Patent Application No. 2012-225001 filed with the Japan Patent Office on Oct. 10, 2012, which is herein incorporated by reference in its entirety.

REFERENCE SIGNS LIST

10 automatic lathe apparatus main unit (apparatus main unit)
10a linear guide
11, 12, 13 main spindle
14 exterior cover
15, 67 radio communication unit
16, 68 control unit
17 holder 18 radio ID reader
19, 69 storage unit
50, 150, 250 main console panel
57, 67 radio communication unit (communication unit)
59, 65a selection unit
60 sub-console panel (portable manipulation command input device)
61 front side
62 back side
63 radio ID tag
65 display unit
66 input unit
100 automatic lathe apparatus (apparatus)

The invention claimed is:

1. A portable device comprising:
a user input interface configured to receive user-initiated input of a manipulation command associated with an operation of separate apparatus;
a display interface configured to display information associated with the separate apparatus;
a radio communication interface configured to communicate with the separate apparatus to receive the information and send a manipulation command signal conveying the manipulation command to the separate apparatus;
the portable device configured to be removably attached to the separate apparatus based on insertion of the portable device into a holder of the separate apparatus and further configured to display the information and manipulate the separate apparatus;
a processor configured to detect the portable device being located at least partially within the holder of the separate apparatus, such that the portable device is at least partially enclosed within a portion of the separate apparatus;
the processor further configured to selectively enable or disable input of the manipulation command of the separate apparatus based on a determination of whether the portable device is located at least partially within the holder of the separate apparatus, such that the processor, based on the determination, performs one of,
enabling the input of the manipulation command of the separate apparatus and further enabling display of the information exclusively based on a determination that the portable device is located at least partially within the holder of the separate apparatus, and
disabling the input of the manipulation command of the separate apparatus while allowing display of the information based on a determination that the portable device is located external to the holder of the separate apparatus.

2. The portable device according to claim 1, wherein
the processor is configured to detect the portable device being set at a certain preset setting position associated with the separate apparatus, and
the processor recognizes the setting of the portable device at the setting position as the placing of the portable device within the holder of the separate apparatus.

3. The portable device according to claim 1, wherein the portable device is a tablet type personal computer.

4. The portable device according to claim 1, wherein
the display interface is configured as a touch panel type input unit, and
the display interface includes the user input interface.

5. The portable device according to claim 1, wherein the separate apparatus is a machine tool.

6. An apparatus comprising:
a separate apparatus; and
the portable device according to claim 1.

7. The apparatus according to claim 6, wherein the separate apparatus includes:
a manipulation command input device configured to input a manipulation command to the separate apparatus, in addition to the portable device; and
an input switch device configured to switch the portable device and the manipulation command input device selectively from one to another as an input device assigned to input a manipulation command to the separate apparatus.

8. An apparatus, comprising:
a first device, including a holder; and
a second device configured to,
removably attach to the first device based on insertion of the second device into the holder of the first device such that the second device is at least partially enclosed within a portion of the first device,
display information associated with the first device,
receive input of a manipulation command associated with an operation of an first device, and
manipulate the first device according to the manipulation command; the first device and the second device collectively configured to,
selectively enable or disable manipulation of the first device according to manipulation input commands received at the second device, based on a determination of whether the second device is at least partially located within the holder of the first device, such that the first device and the second device collectively, based on the determination, perform one of
enable manipulation of the first device according to the manipulation input commands received at the second device, exclusively based on a determination that the second device is at least partially enclosed within the portion of the first device, and
disable manipulation of the first device according to the manipulation input commands received at the second device, based on a determination that the second device is located external to the portion of the first device.

9. The apparatus of claim 8, wherein,
the first device includes a radio identification (ID) reader located in the holder device;
the second device includes a radio ID tag configured to indicate a particular ID number associated with the second device; and
the first device and the second device are collectively configured to,
position the radio ID tag proximate to the radio ID reader, based on the second device being inserted in the holder device
read, at the first device, an ID number from the radio ID tag, based on the radio ID reader reading the radio ID tag,
communicate the read ID number from the first device to the second device, and
selectively enable manipulation of the first device according to manipulation input commands received at the second device, based on a determination that the read ID number matches an ID number stored at the second device.

* * * * *

UNITED STATES PATENT AND TRADEMARK OFFICE
CERTIFICATE OF CORRECTION

PATENT NO. : 9,703,282 B2  
APPLICATION NO. : 14/430471  
DATED : July 11, 2017  
INVENTOR(S) : Shigeo Yanagidaira et al.

Page 1 of 1

It is certified that error appears in the above-identified patent and that said Letters Patent is hereby corrected as shown below:

On the Title Page

(73) – Assignees should read:

Citizen Watch Co., Ltd., Tokyo, Japan  
Citizen Machinery Co., Ltd., Nagano, Japan  
Mitsubishi Electric Corporation, Tokyo, Japan Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*